(12) United States Patent
Gallana Blanco et al.

(10) Patent No.: US 8,292,255 B2
(45) Date of Patent: Oct. 23, 2012

(54) HYBRID TOOLING FOR THE CURING OF COMPOSITE PIECES

(75) Inventors: Jorge Juan Gallana Blanco, Madrid (ES); Aguilino Garcia Garcia, Madrid (ES)

(73) Assignee: Airbus Operations S.L., Madrid (ES)

( * ) Notice: Subject to any disclaimer, the term of this patent is extended or adjusted under 35 U.S.C. 154(b) by 558 days.

(21) Appl. No.: 11/794,486

(22) PCT Filed: Dec. 29, 2005

(86) PCT No.: PCT/EP2005/057211
§ 371 (c)(1),
(2), (4) Date: Jun. 1, 2009

(87) PCT Pub. No.: WO2006/070013
PCT Pub. Date: Jul. 6, 2006

(65) Prior Publication Data
US 2009/0236044 A1 Sep. 24, 2009

(30) Foreign Application Priority Data
Dec. 30, 2004 (ES) .................................. 200403143

(51) Int. Cl.
*B28B 7/36* (2006.01)
(52) U.S. Cl. ..................... 249/114.1; 249/115; 249/135; 249/139; 425/470
(58) Field of Classification Search .................. 425/403, 425/470; 249/114.1, 115, 135, 139, 134, 249/205, 117; 264/219, 220
See application file for complete search history.

(56) References Cited

U.S. PATENT DOCUMENTS

| | | | |
|---|---|---|---|
| 4,398,693 A | 8/1983 | Hahn et al. | |
| 5,746,553 A * | 5/1998 | Engwall | 409/132 |
| 5,902,535 A | 5/1999 | Burgess et al. | |
| 6,168,358 B1 | 1/2001 | Engwall et al. | |
| 6,378,836 B1 * | 4/2002 | Anthony | 249/114.1 |
| 6,759,002 B1 | 7/2004 | Engwall et al. | |
| 2002/0096620 A1 | 7/2002 | Amthony | |
| 2003/0201580 A1 | 10/2003 | Christensen et al. | |

FOREIGN PATENT DOCUMENTS

| | | |
|---|---|---|
| EP | 0 436 237 A1 | 10/1991 |
| EP | 1 231 046 | 8/2002 |
| EP | 1 231 046 A2 | 8/2002 |

* cited by examiner

*Primary Examiner* — Richard Crispino
*Assistant Examiner* — Thukhanh Nguyen
(74) *Attorney, Agent, or Firm* — Ladas & Parry LLP

(57) ABSTRACT

The invention relates to a hybrid tooling (1) for the curing of composite pieces, comprising a support structure (3) made of a metallic material with high thermal diffusivity, a base plate (31) with an identical surface geometry as that of the piece to be cured, made of INVAR 36 or NILO 36, an intermediate structure (21) between the support structure (3) and the base plate (31), with a cell configuration, with the sides of each cell sufficiently lightened so as to facilitate the flow of air under the base plate (31) during the curing cycle, made of INVAR 36 or NILO 36, and means of fixing the intermediate structure (21) to the support structure (3) which allow their free expansion.

7 Claims, 3 Drawing Sheets

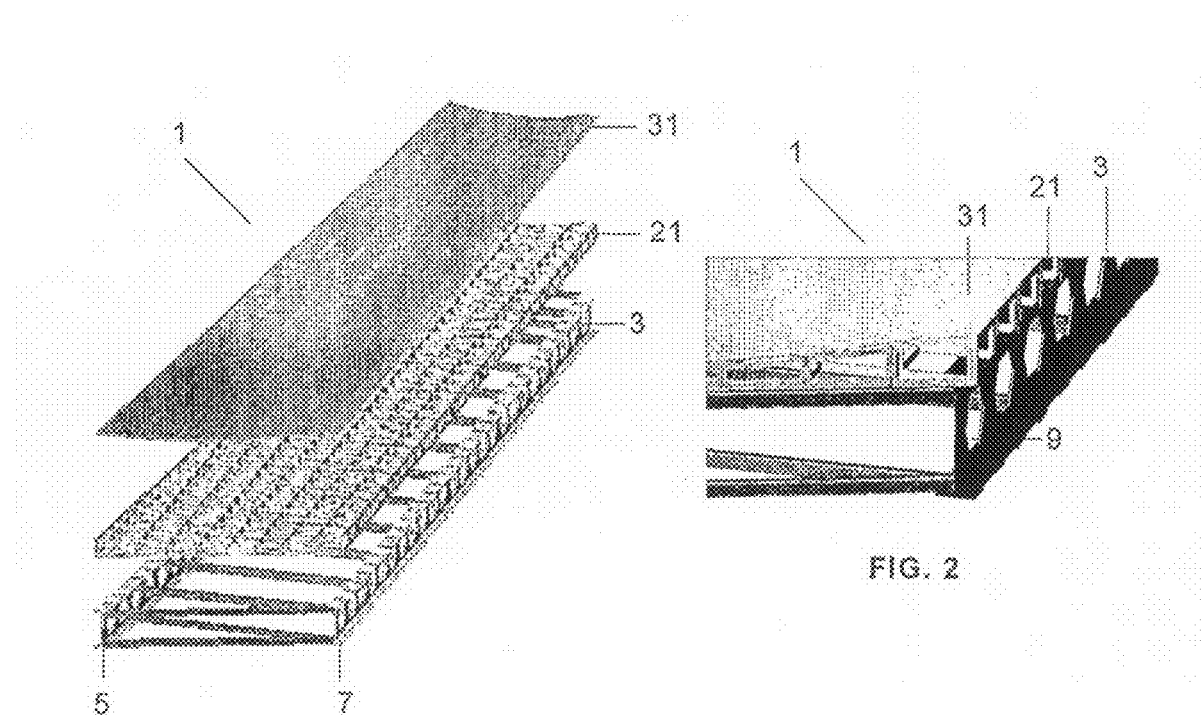
FIG. 1
FIG. 2
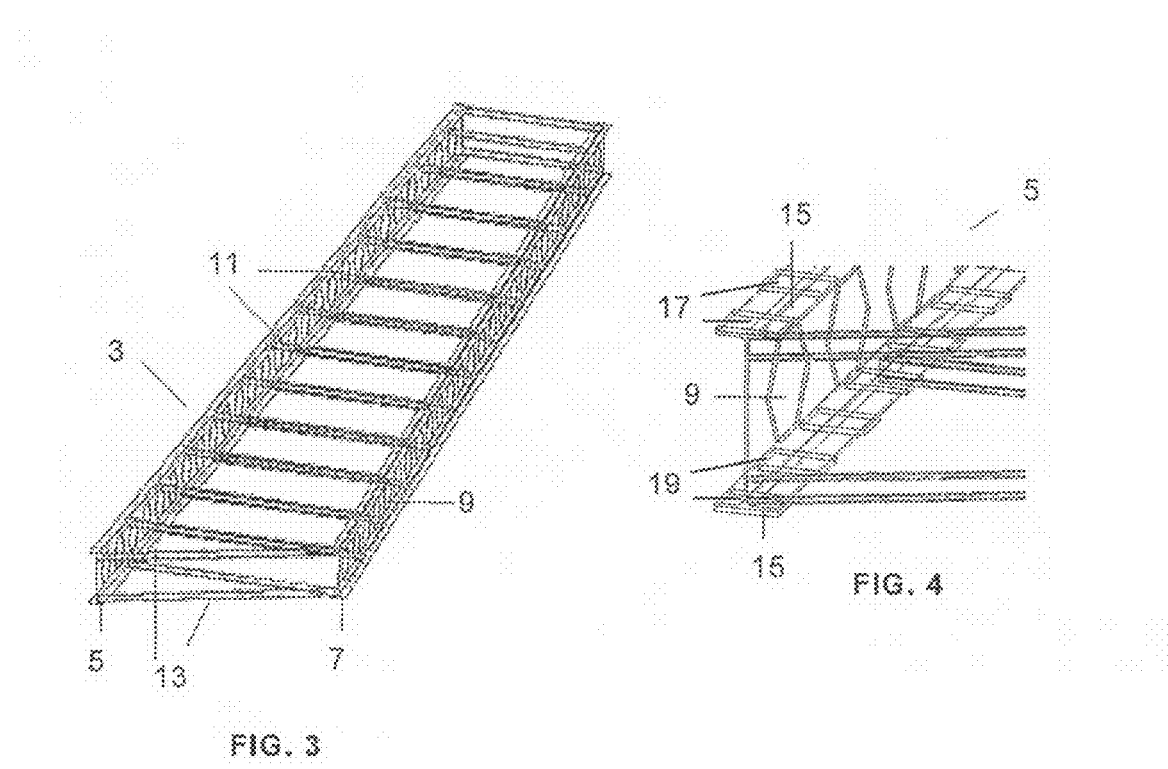
FIG. 3
FIG. 4

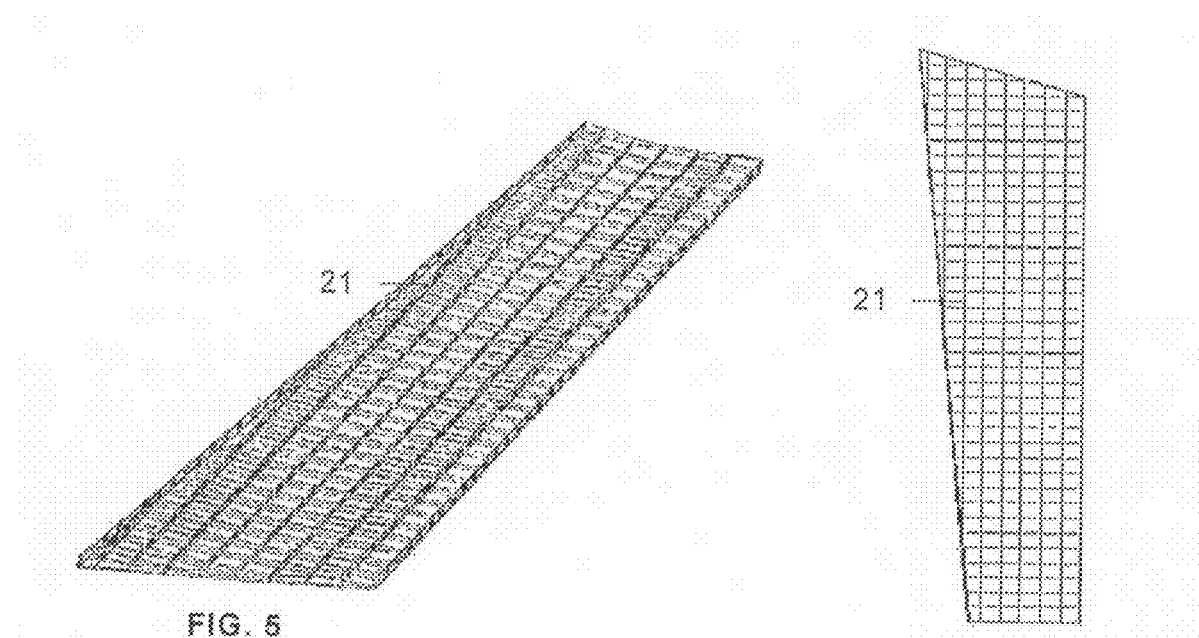
FIG. 5
FIG. 6
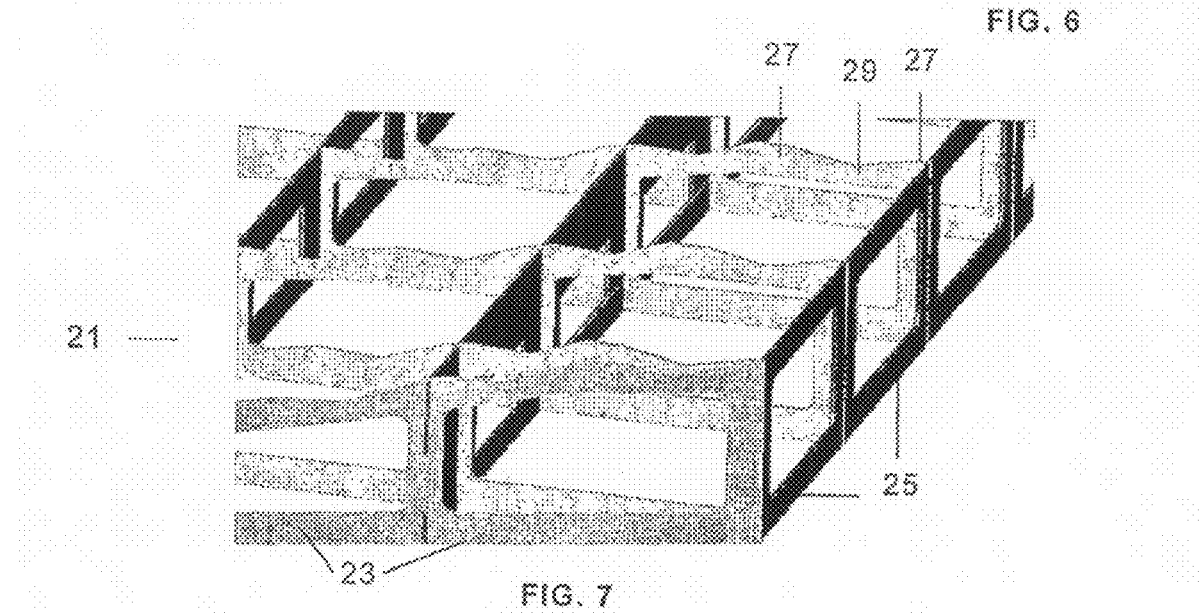
FIG. 7
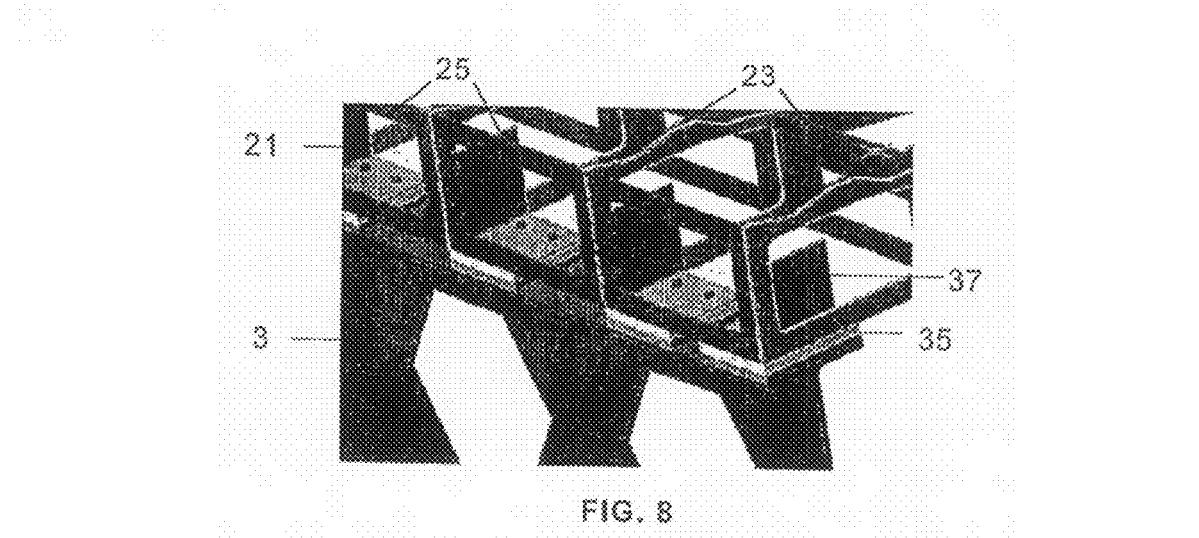
FIG. 8

HYBRID TOOLING FOR THE CURING OF COMPOSITE PIECES

FIELD OF THE INVENTION

The present invention relates to a tooling for the curing of composite pieces, and more specifically, to a steel and a thermosetting alloy hybrid tooling for the curing of composite pieces.

BACKGROUND OF THE INVENTION

The laminating of the material and its subsequent curing in an autoclave in a mold providing the geometry of the target piece is required for the curing of a composite piece. Bonds occur between the resin molecules during the curing cycle, obtaining the desired mechanical characteristics of the material. This requires subjecting the material to a temperature pressure cycle inside an autoclave, confining the sheet in an enclosure on a pressure-tight tooling and closed by a vacuum bag.

The geometry of the tooling at the temperature at which the resin hardens must be the final geometry of the piece considering the thermal expansion coefficients of the material itself and of the tooling. Correction coefficients of the geometry of the tooling are applied to account for this effect, an added difficulty to the design thereof. The ideal situation is to use a material for manufacturing the tooling that has the same expansion coefficient as that of the piece once it is cured given that, in this manner, from the moment in which the resin hardens, and during the cooling, the geometry of the piece will be perfectly adapted to the tooling and the references traced on the tooling will be marked on the piece in its correct position. This must be compatible with the fact that the material used to manufacture the toolings must have the smallest thermal mass possible, preserving certain mechanical and durability characteristics which allow its use in an industrial process, particularly including subjecting it to autoclave cycles with no loss of said characteristics.

The use of thermosetting metallic materials such as, among others, those commercially called INVAR 36, NILO 36, allows achieving the characteristics necessary for the manufacture of toolings for autoclave curing, although it has a series of drawbacks with respect to other conventional metallic materials also used in tooling, such as construction steels. The following must be pointed out among the most important comparative disadvantages affecting the process: fewer mechanical characteristics, less diffusivity, greater thermal mass and a much higher raw material cost.

SUMMARY OF THE INVENTION

The present invention proposes a tooling that satisfactorily resolves the previously mentioned problems, especially for the case of large toolings required in the aeronautical industry.

According to the invention, the tooling comprises:
A support structure made of a metallic material with high thermal diffusivity, such as construction steel.
A base plate with an identical surface geometry as that of the piece to be cured, made of a thermosetting metallic material such as INVAR 36 or NILO 36.
An intermediate structure between the support structure and the base plate with a cell configuration, of the egg carton type, made of a thermosetting material such as INVAR 36 or NILO 36.
Means of fixing the intermediate structure to the support structure which allow their free expansion.

The tooling is made, on one hand, with low cost materials with high thermal diffusivity to achieve a suitable thermomechanical performance, and on the other hand with thermosetting metallic materials on its useful surface which allow manufacturing composite pieces without the restrictions due to different expansion coefficients of the piece and the tooling.

Toolings with the smallest thermal mass are obtained with the mentioned configuration, reducing the required raw material, in turn having sufficient structural rigidity so that the geometry of the piece is the correct one, particularly desirable features for large toolings used in the aeronautical industry.

Other features and advantages of this invention will be understood from the following detailed description of an illustrative embodiment of its object in relation to the attached drawings.

DESCRIPTION OF THE DRAWINGS

FIG. 1 is a schematic view showing the three basic elements forming the tooling object of this invention.

FIG. 2 shows a perspective view of a corner of the tooling object of this invention with its components assembled.

FIG. 3 shows a perspective view of the support structure of the tooling object of this invention.

FIG. 4 shows a detail view of corner portion of the support structure of the tooling object of this invention.

FIGS. 5 and 6 show perspective and plan views, respectively, of the intermediate structure of the tooling object of this invention.

FIG. 7 shows a detail view of a corner portion of the intermediate structure of the tooling object of this invention.

FIG. 8 shows a perspective view showing the fixing of the intermediate structure to the support structure.

DETAILED DESCRIPTION OF THE INVENTION

Figure 9:
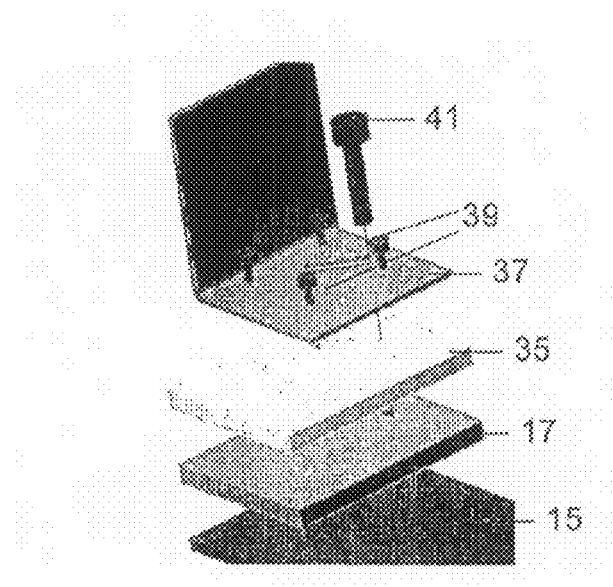
FIG. 9 shows an exploded perspective view of the different elements forming the means of fixing the intermediate structure to the support structure.
Figure 10:
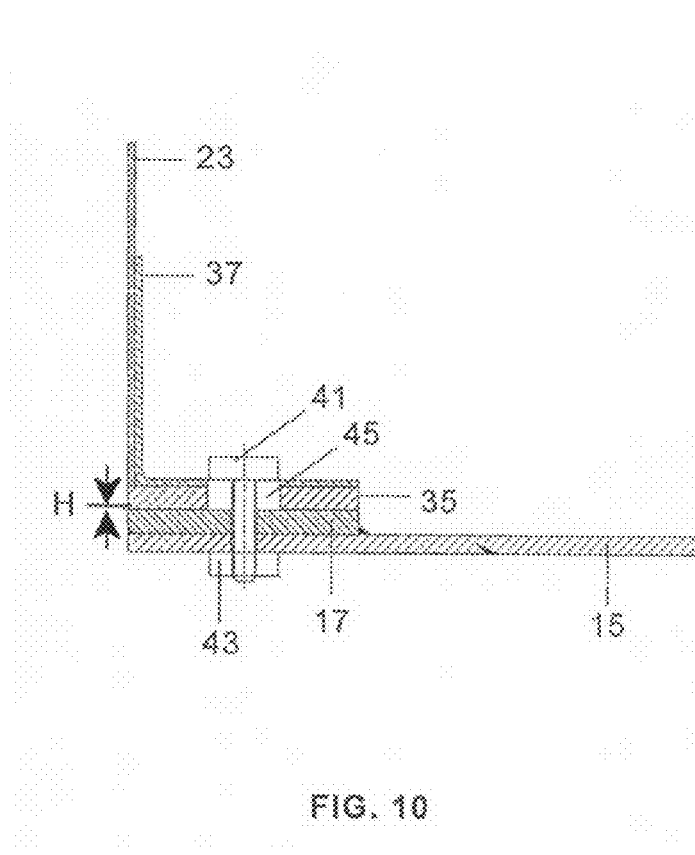
FIG. 10 shows a side elevational view of the different elements forming the means of fixing the intermediate structure to the support structure.
Figure 11:
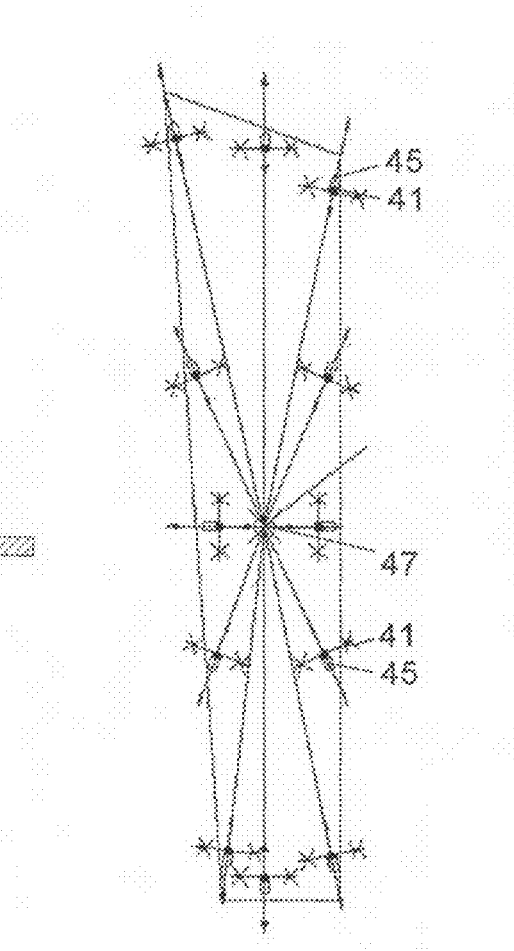
FIG. 11 schematically shows the configuration of the slits of the bolts used to fix the intermediate structure to the support structure.

The tooling 1 for curing according to the invention in the first place comprises a support structure 3, preferably made of construction steel, with two longitudinal beams 5, 7 with hexagonal lightening holes 9 in the webs, mounted with transverse pipes 11 and diagonal pipes 13, preferably made of electrowelded steel, and crossbeams to reinforce the areas of the hoisting points (not represented).

Arranged on the support structure 3 there is a braced intermediate structure 21 made of a thermosetting alloy such as INVAR-36, NILO 36 or the like, and a base plate 30 thereon, also of a thermosetting alloy, machined with the geometry of the piece to be cured on the surface in contact with the tooling.

Leveling plates 17, 19, preferably made of steel, which are machined once the support structure 3 is formed, are welded on the flanges 15 of the beams 5, 7 of the support structure 3 and under them so as to obtain, by means of the bottom plates 17, a support plane of the support structure 3, and by means of top plates 19, a support and reference plane of the intermediate structure 21.

The leveling plates 17 welded under the beams therefore define the support, leveling and centering points of the support structure 3.

The base plate 31, formed by welded thermosetting alloy plates, previously formed so as to adapt it to the final desired surface, is welded on the intermediate structure 21. Once the base plate 31 is machined, it must be high-temperature proof on its entire surface.

The intermediate structure 21 must be designed such that the flow of air during the autoclave curing cycle under the base plate 31 is facilitated. A preferred configuration is the structure shown in detail in FIG. 7, formed by means of transverse brackets 23 and longitudinal brackets 25 with large inner lightening holes.

The support and welding of the base plate 31 on the transverse brackets 23 is done discretely. The shape of the bracket between the support points is an arc of circumference 29 that guards minimum specified distances between the lightening holes and the contour of the bracket. The support and welding of the base plate 31 on the longitudinal brackets 25 will be done the same way as on the transverse brackets.

The perimetral brackets will perfectly adapt to the shape of the base plate 31 on the entire perimeter of the bottom surface, being welded to it with intermittent weld beads.

The intermediate structure 21 is supported on the support structure 3 by means of sliding skids 35, preferably made of bronze, that are joined to the intermediate structure through the angle irons 37, welded (intermittent weld bead) to the transverse brackets 23. The skids are joined to the angle irons 37 by means of screws 39.

The mentioned support of the intermediate structure 21 on the support structure 3 takes place on the leveling plates 17 welded and machined on the top flange 15 of the beams 5, 7 of the support structure 3, forming a common support plane of all the sliding skids 35.

The fixing of the intermediate structure 21 on the support structure 3 is carried out through bolts 41 passing through the angle irons 37, the sliding skids 35, the leveling plates 17 and the flange 15 of the beams 5, 7, leaving, with the nut 43 tightened on the side of the beam, an allowance A between the sliding skid 35 and the leveling plates 17 supporting them.

The configuration of the bolts 41 must allow the free expansion of the two structures 3, 21 independently such that in any expansion condition, the direction of the longitudinal and transverse axes of the tooling (the expansion center of the base plate is maintained fixed during expansion) is preserved. This is achieved by making slits 45 in the sliding plates and in the angle irons. To size the slits 45 it must be taken into account that their direction must be that of the connecting line between the expansion center 47 and the center of the bolt 41.

The slits 45 must have enough length on the sliding skids 35 and on the angle irons 37 so that the axis of the bolt 41, fixed in the leveling plate 17 and in the flange 15 of the beam 5, 7, can slide with no interference during the entire curing cycle.

The base plate 31 must incorporate welded (tight weld) thermosetting alloy blocks in openings made on the plate to allow the drilling of the points of attachment of the tooling on the plate with no loss of tightness.

Any modifications comprised within the scope defined by the following claims can be introduced in the preferred embodiment described above.

The invention claimed is:

1. A tooling for the curing of composite pieces, which comprises:
   a) a support structure made of a metallic material with high thermal diffusivity;
   b) a base plate with an identical surface geometry as that of the piece to be cured, which base plate is made of a thermosetting metallic material;
   c) an intermediate structure between the support structure and the base plate with a cell configuration, with the sides of each cell being designed so as to facilitate the flow of air under the base plate during the curing cycle, made of a thermosetting metallic material; and
   d) means of fixing the intermediate structure to the support structure allowing their free expansion.

2. A tooling for the curing of composite pieces according to claim 1, wherein the intermediate structure is made by means of lightened longitudinal brackets and transverse brackets.

3. A tooling for the curing of composite pieces according to claim 1, wherein the support structure is formed by two longitudinal beams in double T-shape joined by means of transverse elements, said beams incorporating a plurality of leveling plates, made of steel, welded on their flanges so as to configure its bottom support surface and the support plane thereon of the intermediate structure.

4. A tooling for the curing of composite pieces which comprises:
   a) a support structure made of a metallic material with high thermal diffusivity and formed by two longitudinal beams in double T-shape joined by means of transverse elements, said beams incorporating a plurality of leveling plates, made of steel, welded on their flanges so as to configure its bottom support surface and the support plane thereon of the intermediate structure;
   b) a base plate with an identical surface geometry as that of the piece to be cured, made of a thermosetting metallic material;
   c) an intermediate structure between the support structure and the base plate with a cell configuration, with the sides of each cell being sufficiently lightened so as to facilitate the flow of air under the base plate during the curing cycle, made of a thermosetting metallic material; and
   d) means of fixing the intermediate structure to the support structure allowing their free expansion said means comprising sliding skids on the leveling plates, joined by means of screws to angle elements welded to the transverse brackets, and bolts passing through them and through the leveling plates and the top flange of the beams through openings having a slit configuration on the sliding skids and the angle elements, with their longitudinal axis oriented towards the expansion center of the base plate.

5. A tooling for the curing of composite pieces according to claim 1, wherein the base plate includes thermosetting alloy blocks welded in openings made thereon so as to allow the attachment of the toolings on the plate with no loss of tightness.

6. A tooling for the curing of composite pieces, which comprises:
   a) a support structure made of a metallic material with high thermal diffusivity;
   b) a base plate with an identical surface geometry as that of the piece to be cured, made of a thermosetting metallic material;
   c) an intermediate structure between the support structure and the base plate with a cell configuration, with the sides of each cell being designed so as to facilitate the flow of air under the base plate during the curing cycle, made of a thermosetting metallic material;
wherein said intermediate structure is mounted on the support structure by means of sliding skids that are joined to the intermediate structure and are supported by machined surfaces mounted on top of said support structure thereby allowing free expansion of said intermediate structure.

7. A tooling according to claim 6 wherein said sliding skids are made of bronze.

* * * * *